United States Patent [19]

Kanagawa et al.

[11] 4,182,803
[45] Jan. 8, 1980

[54] ELASTOMER

[75] Inventors: Shuichi Kanagawa, Osaka; Tamotsu Miki, Ichihara, both of Japan

[73] Assignee: Sumitomo Chemical Company, Limited, Osaka, Japan

[21] Appl. No.: 694,537

[22] Filed: Jun. 10, 1976

Related U.S. Application Data

[63] Continuation of Ser. No. 529,938, Dec. 5, 1974, Pat. No. 3,993,714.

[30] Foreign Application Priority Data

Mar. 22, 1974 [JP] Japan ............................. 49-32766
Jun. 7, 1973 [JP] Japan ............................. 48-64559

[51] Int. Cl.² ........................................... C08F 216/02
[52] U.S. Cl. ...................................... 526/313; 526/295
[58] Field of Search ................. 260/47 UA, 62, 879, 260/880 R, 878 R; 526/313

[56] References Cited

U.S. PATENT DOCUMENTS

| | | | |
|---|---|---|---|
| 2,583,638 | 1/1952 | Evans | 260/62 |
| 2,647,882 | 8/1953 | Evans | 260/47 UA |
| 2,647,883 | 8/1953 | Evans | 260/47 UA |

*Primary Examiner*—Paul R. Michl
*Attorney, Agent, or Firm*—Stevens, Davis, Miller & Mosher

[57] ABSTRACT

A new modified elastomer having a phenolic hydroxyl group on the side chain, which is excellent in physical properties, crosslinkability, thermal stability, tackiness, adhesiveness and compatibility, is obtained by copolymerizing at least one monomer selected from the group consisting of conjugated dienes, and mono-ethylenically unsaturated monomers, or graft-copolymerizing an elastomer prepared by polymerizing at least one monomer defined above, with a phenolic monomer represented by the general formula,

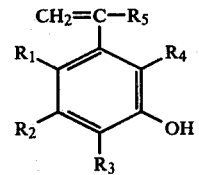

wherein $R_1$, $R_2$, $R_3$, $R_4$ and $R_5$ are individually an alkyl group or a hydrogen atom.

22 Claims, No Drawings

ELASTOMER

This is a continuation of application Ser. No. 529,938, filed Dec. 5, 1975, now U.S. Pat. No. 3,993,714.

This invention relates to a new modified elastomer having a phenolic hydroxyl group on the side chain.

It is well known that for final use as rubber products, elastomers are generally required to be subjected to a complex operation such as curing, and thus are necessarily limited in their uses and processability. In order to avoid the complex operation and difficulties encountered in the curing of elastomers, it is effective to make the elastomers themselves reactive. That is, the difficulties encountered in the curing of elastomers can be greatly alleviated by introducing specific reactive groups into the elastomers themselves, so that the resulting reactive elastomers having reactive groups can be put into various uses, taking advantage of their reactivity.

Therefore, there has been required a development of a modified elastomeric polymer to which a reactivity is imparted in addition to the characteristic properties inherent to the polymer by use of, for example, a phenolic compound.

There are some literature on polymerization of phenolic compounds having a double bond at the α-position of the side chain, and they report that the polymerization is difficult when common radical-polymerization catalysts are used. Further, it is disclosed in Japanese patent application laid-open No. 15496/1972 that a novel phenolic copolymer can be obtained by copolymerizing the phenolic compound with a conjugated diolefin in the presence of a radical-polymerization catalyst. According to the method, however, an organic solvent is essential for the copolymerization, and further the copolymerization requires a very complicated operation that the polymerization system is first solidified by cooling and then returned to room temperature followed by polymerization at a required temperature. Nevertheless, the yield is as low as 20 to 30%, so that the method can not be applied to the industrial production. The reason of the low yield is as follows: the phenolic compound which is practically used in the copolymerization is very unstable as a monomer, as it has a hydroxyl group at the para-position relative to the carbon atom to which a side chain having a double bond at the α-position is connected, and therefore it converts to a stable form by releasing a hydrogen radical with ease or by dimerization or trimerization, whereby the objective copolymerization is made difficult or undesirable homopolymer thereof becomes easy to be produced.

Therefore, the copolymer having the function as a phenolic copolymer, can only be obtained without the characteristic properties inherent to the polymer of diolefins.

The present inventors have studied to develop a novel modified elastomer which has a reactivity in addition to the characteristic properties inherent to the polymer, and found that the modified elastomer can be obtained by using a phenolic compound having a hydroxyl group at the meta-position relative to the carbon atom to which the side chain is connected.

Thus the present invention provides a novel modified elastomer having a phenolic hydroxyl group on the side chain, characterized in that the elastomer is obtained by polymerizing (a) at least one monomer selected from the group consisting of conjugated dienes and monoethylenically unsaturated monomers, or (b) an elastomer prepared by polymerizing at least one monomer defined above, with (c) a phenolic monomer represented by the general formula (1),

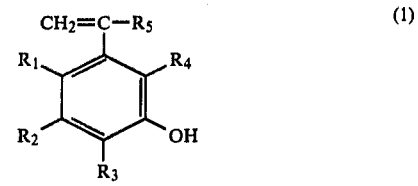

wherein $R_1$, $R_2$, $R_3$, $R_4$ and $R_5$ are individually a hydrogen atom or an alkyl group, and provides a process for producing the said modified elastomer.

In the present specification, the term "alkyl" is intended to mean an alkyl having 1 to 10 carbon atoms in case of $R_1$, $R_2$, $R_3$ and $R_4$ and an alkyl having 1 to 4 carbon atoms in case of $R_5$.

The present invention is illustrated in more detail as follows.

The phenolic monomer having a specific structure which is used in the present invention is a cationic- or radical-polymerizable monomer represented by the aforesaid general formula (1). The examples of said monomer specifically include m-hydroxystyrene, m-hydroxy-α-methylstyrene, 3-hydroxy-4-methylstyrene, 3-hydroxy-4,6-dimethylstyrene, 3-hydroxy-4,6-diisopropylstyrene, 3-hydroxy-4-tert-butylstyrene, 3-hydroxy-4,6-di-tert-butylstyrene, 3-hydroxy-4-methyl-α-methylstyrene, 3-hydroxy-4-isopropylstyrene, 3-hydroxy-4,6-dimethyl-α-methylstyrene, 3-hydroxy-4-isopropyl-α-methylstyrene, 3-hydroxy-4,6-diisopropyl-α-methylstyrene, 3-hydroxy-4-tert-butyl-α-methylstyrene, 3-hydroxy-4,6-di-tert-butyl-α-methylstyrene, 3-hydroxy-4-nonylstyrene and 3-hydroxy-4-nonyl-α-methylstyrene. These phenolic monomers may be used either singly or in combination thereof. In preparation of the present modified elastomer, p-hydroxystyrene, p-hydroxy-α-methylstyrene and/or nuclear alkyl derivatives thereof may be contained in the phenolic monomer of the formula (1) in an amount less than that of the phenolic monomer.

Examples of the conjugated dienes to be copolymerized with the compound of the formula (1) include butadiene, isoprene, 1,3-pentadiene and chloroprene. Examples of the monoethylenically unsaturated monomers include unsaturated nitriles such as acrylonitrile; monovinyl aromatic hydrocarbons such as styrene; unsaturated carboxylic acids and esters thereof such as acrylic acid and methyl methacrylate; vinyl esters such as vinyl acetate; and monoolefins such as ethylene, propylene and isobutene, which are all ordinarily used as constitutive monomer units of elastomers produced by cationic or radical polymerization. These monomers may be used either singly or in the form of a mixture of two or more members.

Copolymerization procedures adopted in the present invention are any one disclosed in, for example, Kanbara et. al. "Gosei Gomu Handbook" (Handbook of Synthetic Rubber), printed by Asakura Shoten in Japan, 1967.

More concretely speaking, the radical copolymerization is carried out according to emulsion-, solution-, bulk- or suspension-polymerization in the presence of a polymerization initiator at a temperature ranging from −10° to 200° C., preferably from 0° to 100° C. The cationic copolymerization is carried out according to solution- or bulk-polymerization in the presence of a polymerization initiator at a temperature ranging from −100° to 100° C., preferably from −100° to 20° C.

The polymerization initiator used in the radical copolymerization may be any of the conventional radical polymerization initiators which include, for example, hydroperoxides such as cumene hydroperoxide and p-menthane hydroperoxide, peracids and esters thereof such as peracetic acid and potassium persulfate, peroxides such as lauryl peroxide and benzoyl peroxide, and azo compounds such as 2,2'-azobisisobutyronitrile, and a mixture thereof. The polymerization initiator used in the cationic polymerization may also be any of the conventional cationic polymerization initiators which include, for example, Friedel-Crafts catalyst type metal halides such as boron trifluoride, tin tetrachloride and aluminum chloride.

The emulsifier to be used in the copolymerization according to emulsion polymerization is a nonionic, anionic, cationic or amphoteric surfactant.

The solvent to be used in the copolymerization according to solution polymerization is an inert solvent which can dissolve the monomers and catalysts but does not react therewith, and includes, for example, aromatic hydrocarbons such as benzene and toluene, aliphatic hydrocarbons such as n-hexane and cyclohexane, halogenated hydrocarbons such as methyl chloride and methylene chloride, and ethers such as tetrahydrofuran.

The polymerization time varies depending on the above prescription but is ordinarily within at most 48 hours.

In the above case, the amount of the phenolic monomer of the formula (1) is not particularly limited, but is preferably 0.5 to 10 parts by weight per 100 parts by weight of the monomer. If the amount of the phenolic monomer is less than 0.5 part by weight, no effect of addition of the phenolic monomer is observed, while even if the amount of the phenolic monomer is increased to more than 10 parts by weight, not only an enhanced effect of addition of the phenolic monomer is scarcely observed but also the polymerization rate is undesirably lowered. As mentioned previously, the present invention has such advantage that the copolymerization can be effected by adoption of any prescription employed in the production of conventional elastomers, or a prescription similar thereto.

On the other hand, in case where the modified elastomer is prepared by the ordinary anionic polymerization, the polymerization initiator used is required to be increased in amount. It is therefore desirable that an elastomer and said phenolic monomer (1) are subjected to graft-copolymerization. In this case, the amount of the phenolic monomer (1) is not particularly limited, but is preferably 0.5 to 10 parts by weight per 100 parts by weight of the starting elastomer.

The elastomer used in the graft-copolymerization includes, for example, ethylene-propylene rubbers, solution-polymerized styrene-butadiene rubbers, cis-polybutadiene rubbers and polyisoprene rubbers which are produced by use of an anionic or coordination anionic polymerization initiator such as a Ziegler type catalyst or an alkyllithium catalyst. There are also included such elastomers as, for example, polybutadiene rubbers, styrene-butadiene rubbers, high styrene rubbers, acrylonitrile-butadiene rubbers, butyl rubbers, chloroprene rubbers and ethylene-vinyl acetate rubbers which are produced by use of a cationic or radical polymerization initiator.

The graft-copolymerization may be conducted according to emulsion-, solution-, bulk- or suspension-polymerization in the presence or absence of a polymerization initiator at a temperature of 0° to 300° C., preferably 40° to 200° C.

The graft-copolymerization can be effected using the same initiator if used, emulsifier and solvent used in the radical copolymerization mentioned above. The polymerization time varies depending on the prescription but is ordinarily within at most 48 hours.

Modified elastomers obtained according to any of the above-mentioned polymerization procedures, which are high molecular weight compounds having phenolic hydroxyl groups on the side chains, not only can display markedly excellent crosslinkability while maintaining characteristic properties inherent to elastomers but also show excellent thermal stability, tackiness and adhesiveness and are high also in compatibility with polymers having phenol nuclei.

Accordingly, the process of the present invention can favorably be applied particularly for modification of butadiene-containing rubbers such as polybutadiene rubbers, cis-polybutadiene rubbers, styrene-butadiene rubbers, high styrene rubbers and acrylonitrile-butadiene rubbers, which are required to be improved in various properties such as crosslinkability, thermal stability, tackiness, adhesiveness and compatibility with polymers having phenol nuclei. The thus obtained elastomers can be applied for the conventional utilities, for example, used as dry rubber and latex. Particularly when used in the form of latex, the modified elastomers can effectively be applied to fiber or paper processing or applied as paints, tackifiers, adhesives and coating agents.

The present invention is illustrated in more details below with reference to examples, but the invention is not limited to the examples and various modification are possible within the scope of the invention. In the examples, all the parts and percentages are by weight.

EXAMPLE 1

Using a 5 liter-autoclave equipped with a stirrer, the copolymerization of styrene, butadiene and m-hydroxy-α-methylstyrene was conducted according to the following prescription:

| Components | Amount (parts by weight) |
| --- | --- |
| Butadiene | 710 |
| Styrene | 240 |
| m-Hydroxy-α-methylstyrene | 50 |
| Deionized water | 2,000 |
| tert-Dodecylmercaptan | 2.0 |
| Potassium salt of disproportionated rhodinic acid | 45.0 |
| Sodium salt of polymerized alkylnaphthalene sulfonic acid | 0.52 |
| Sodium salt of ethylenediamine tetraacetic acid | 0.32 |
| p-Menthane hydroperoxide | 0.44 |
| $FeSO_4 \cdot 7H_2O$ | 0.22 |
| $Na_3PO_4 \cdot 12H_2O$ | 10.40 |
| Sodium formaldehyde sulfoxylate | 0.68 |

The copolymerization was effected at 5° C. for 12 hours, and then terminated by addition of sodium dimethyl dithiocarbamate as a terminator. Subsequently, steam was passed through the system to remove unreacted monomers. Thereafter, sodium chloride and sulfuric acid were added to the emulsion to salt-out the polymerization product, which was then water-washed and dried to obtain an elastomeric polymer in a yield of 51%.

This polymer was purified by re-precipitation from acetone, and then measured on the nuclear magnetic resonance spectrum and infrared absorption spectrum to confirm that the polymer was a ternary copolymer comprising styrene, butadiene and hydroxy-α-methylstyrene. According to the acetylation method and from the results of analysis of nuclear magnetic resonance spectrum, it was found that the copolymer was composed of 14% of styrene, 77% of butadiene and 9% of hydroxy-α-methylstyrene. The intrinsic viscosity of the copolymer, as measured in toluene at 30° C., was 0.62 dl/g.

The elastomer thus obtained was dissolved in benzene and thoroughly mixed with diphenylmethane-4,4'-diisocyanate of 5% based on the elastomer. On heating the solution at 120° C. for 30 minutes, the elastomer was crosslinked and separated as an insoluble matter from the solution.

EXAMPLE 2

The copolymerization was carried out in the same manner as described in Example 1, except that the monomer mixture was replaced by a mixture of 950 parts of butadiene and 50 parts of a 8:2 mixture of m- and p-hydroxy-α-methylstyrene, to obtain an elastomeric polymer in a yield of 55%. This polymer was purified by re-precipitation from acetone, and then measured on the nuclear magnetic resonance spectrum and infrared absorption spectrum to confirm that the polymer was a binary copolymer comprising butadiene and hydroxy-α-methylstyrene. According to the acetylation method and from the results of analysis of nuclear magnetic resonance spectrum, it was found that the copolymer was composed of 83% of butadiene and 17% of hydroxy-α-methylstyrene. The intrinsic viscosity of the copolymer, as measured in toluene at 30° C., was 0.68 dl/g.

EXAMPLE 3

Using a 5 liter-autoclave equipped with a stirrer, the copolymerization of butadiene, m-hydroxy-α-methylstyrene and acrylonitrile was conducted according to the following prescription:

| Components | Amount (parts by weight) |
| --- | --- |
| Butadiene | 650 |
| Acrylonitrile | 320 |
| m-Hydroxy-α-methylstyrene | 30 |
| water | 2,500 |
| Sodium alkylbenzene sulfonate | 6.0 |
| Sodium salt of condensed alkylnaphthalene sulfonic acid | 30 |
| tert-Dodecylmercaptan | 5.0 |
| Potassium persulfate | 2.7 |
| Cyanoethylated diethanolamine | 1.5 |
| Potassium hydroxide | 1.0 |

The copolymerization was effected at 10° C. for 17 hours, and then terminated by addition of sodium dimethyl dithiocarbamate as a terminator. Subsequently, steam was passed through the system to remove unreacted monomers. To the resulting emulsion, sodium chloride and sulfuric acid were added to salt-out the polymerization product, which was then water-washed and dried to obtain an elastomeric polymer in a yield of 55%. This polymer had a Mooney viscosity (ML$_{1+4}$) of 50 as measured at 100° C.

The polymer thus obtained was purified by re-precipitation from acetone, and then measured on the nuclear magnetic resonance spectrum and infrared absorption spectrum to confirm that the polymer was a ternary copolymer comprising butadiene, acrylonitrile and m-hydroxy-α-methylstyrene. According to the acetylation method and from the results of analysis of nuclear magnetic resonance spectrum, it was found that the copolymer was composed of 64% of butadiene, 32% of acrylonitrile and 4% of m-hydroxy-α-methylstyrene.

EXAMPLE 4

A mixture comprising 96 parts of i-butene, which had completely been freed from water and n-butene, 3 parts of isoprene and 1 part of m-hydroxy-α-methylstyrene was added to a one liter-autoclave. To the autoclave was further added 500 parts of methyl chloride, and the resulting mixture was cooled to −78° C. and sufficiently stirred. On the other hand, anhydrous aluminum chloride as a polymerization catalyst was dissolved in methyl chloride to prepare its dilute solution. This solution was also cooled to about −78° C. and added to the autoclave in a proportion of 2%, in terms of aluminum chloride, of the monomer mixture. The resulting mixture was sufficiently stirred, and then subjected to polymerization at −78° C. for 1 hour. Thereafter, the reaction solution was poured into a large amount of hot water to deposit a bulk polymer, which was then dried at 110° C. to obtain an elastomeric polymer in a yield of 50%. This polymer had a Mooney viscosity (ML$_{1+4}$) of 47 as measured at 100° C.

The thus obtained polymer was purified by re-precipitation from acetone, and then measured on the nuclear magnetic resonance spectrum and infrared absorption spectrum to confirm that the polymer was a ternary copolymer comprising i-butene, isoprene and m-hydroxy-α-methylstyrene. According to the acetylation method and from the results of analysis of nuclear magnetic resonance spectrum, it was found that the copolymer was composed of 97 mole % of i-butene, 1 mole % of isoprene and 2 mole % of m-hydroxy-α-methylstyrene.

EXAMPLE 5

Using a one liter-glass vessel equipped with a stirrer, the graft-copolymerization of polybutadiene and a 7:3 mixture of m- to p-hydroxy-α-methylstyrene was conducted according to the following prescription:

| Components | Amount (parts by weight) |
| --- | --- |
| Polybutadiene latex* | 100 |
| m-/p-Hydroxy-α-methylstyrene (7/3) | 5 |
| Cumene hydroperoxide | 0.75 |
| Hydrogenated sodium rhodinate | 2.0 |
| Sodium pyrophosphate | 0.5 |
| Sodium hydroxide | 0.15 |
| Sodium salt of alkylnaphthalene sulfonic acid condensate | 0.15 |
| Dextrose | 1.0 |
| Ferrous sulfate | 0.01 |

| Components | Amount (parts by weight) |
| --- | --- |
| Water (including water in the latex) | 160.0 |

*"JSR 0700" (a registered trade mark of Nihon Gosei Gomu Co. (Japan Synthetic Rubber Co.))

The graft-copolymerization was effected in a nitrogen atmosphere at 65° C. to 85° C. for 6 hours, and then terminated by addition of methanol as a terminator. To the resulting emulsion, magnesium sulfate was added to salt-out the polymerization product, which was then water-washed and dried to obtain an elastomeric polymer in an amount of 104 parts. Using a Soxhlet's extractor, 10 g of the polymer thus obtained was divided with acetone into an acetone-soluble portion and an acetone-insoluble portion to separate a homopolymer of hydroxy-α-methylstyrene from the polymer.

The acetone-soluble portion was separated from the acetone solution as a solid matter of 0.12 g by evaporation of acetone. Thus, the graft efficiency of the m-/p-hydroxy-α-methylstyrene was about 55%.

EXAMPLE 6

In a 2 liter-glass vessel equipped with a stirrer which atmosphere had been replaced with nitrogen, a solution of 100 parts of a cis-polybutadiene ("Diene NF 35", a registered trade mark of Asahi Kasei Co.) in 1,000 parts of toluene was sufficiently stirred at 65° C. To the vessel, 1.2 parts of lauryl peroxide as a polymerization catalyst (in the form of a dilute toluene solution) was added, and was sufficiently mixed with the starting solution under vigorous stirring at 65° C. Into the resulting mixture, 4 parts of 3-hydroxy-4-tert-butylstyrene (in the form of a dilute toluene solution) was gradually dropped from a dropping funnel at 65° C. over a period of about 1 hour. With progress of the reaction, a toluene-insoluble portion was deposited.

After completion of the reaction, the reaction mass composed of tolunene-soluble and toluene-insoluble portions was charged into a large amount of acetone to deposit a bulk polymer, which was then dried at 60° C. to obtain an elastomeric polymer. The Mooney viscosity ($ML_{1+4}$) of the elastomeric polymer was 45 as measured at 100° C., and the amount thereof was 102.8 parts. Thus, the graft efficiency of the 3-hydroxy-4-tert-butylstyrene was about 70%.

What is claimed is:

1. A modified elastomer having a phenolic hydroxyl group on the side chain, characterized in that the modified elastomer is obtained by polymerizing
   (a) at least one conjugated diene selected from the group consisting of butadiene, isoprene, 1,3-pentadiene, and chloroprene, with
   (b) 0.5 to 10 parts by weight per 100 parts by weight of said conjugated diene of a phenolic monomer of the formula

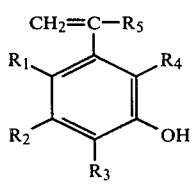

wherein $R_1$, $R_2$, $R_3$, $R_4$, and $R_5$ are individually an alkyl group or a hydrogen atom.

2. A modified elastomer having a phenolic hydroxyl group on the side chain, characterized in that the modified elastomer is obtained by polymerizing
   (a) a mixture of at least one conjugated diene and at least one monovinyl aromatic hydrocarbon, unsaturated nitrile, or mono-olefin with
   (b) 0.5 to 10 parts by weight per 100 parts by weight of said misture of a phenolic monomer of the formula

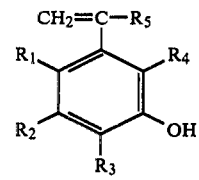

wherein $R_1$, $R_2$, $R_3$, $R_4$, and $R_5$ are individually an alkyl group or a hydrogen atom.

3. The modified elastomer of claim 1 wherein said conjugated diene is butadiene.

4. The modified elastomer of claim 2 wherein said conjugated diene is butadiene.

5. The modified elastomer of claim 2 wherein said monovinyl aromatic hydrocarbon is styrene.

6. The modified elastomer of claim 2 wherein said unsaturated nitrile is acrylonitrile.

7. The modified elastomer of claim 2 wherein said monoolefin is i-butene.

8. The modified elastomer of claim 1 wherein said phenolic monomer is m-hydroxy-α-methylstyrene.

9. The modified elastomer of claim 2 wherein said phenolic monomer is m-hydroxy-α-methylstyrene.

10. The modified elastomer of claim 1 wherein said phenolic monomer is at least one member selected from the group consisting of m-hydroxystyrene, m-hydroxy-α-methylstyrene, 3-hydroxy-4-methylstyrene, 3-hydroxy-4,5-dimethylstyrene, 3-hydroxy-4-isopropylstyrene, 3-hydroxy-4,6-diisopropylstyrene, 3-hydroxy-4-tert-butylstyrene, 3-hydroxy-4,6-di-tert-butylstyrene, 3-hydroxy-4-methyl-α-methylstyrene, 3-hydroxy-4,6-dimethyl-α-methylstyrene, 3-hydroxy-4-isopropyl-α-methylstyrene, 3-hydroxy-4,6-diisopropyl-α-methylstyrene, 3-hydroxy-4-tert-butyl-α-methylstyrene, 3-hydroxy-4,6-di-tert-butyl-α-methylstyrene, 3-hydroxy-4-nonylstyrene, and 3-hydroxy-4-nonyl-α-methylstyrene.

11. The modified elastomer of claim 2 wherein said conjugated diene is at least one member selected from the group consisting of butadiene, isoprene, 1,3-pentadiene, and chloroprene.

12. The modified elastomer of claim 1 wherein the copolymerization is carried out according to radical copolymerization or cationic copolymerization.

13. The modified elastomer of claim 12 wherein the radical copolymerization is carried out according to emulsion-, solution-, bulk- or suspension polymerization in the presence of a polymerization initiator at a temperature of 0° to 100° C.

14. The modified elastomer of claim 13 wherein the polymerization initiator is at least one member selected from the group consisting of hydroperoxides, peracids and their esters, peroxides and azo compounds.

15. The modified elastomer of claim 12 wherein the cationic copolymerization is carried out according to solution- or bulk-polymerization in the presence of a polymerization initiator at a temperature of −100° to 20° C.

16. The modified elastomer of claim 15 wherein the polymerization initiator is a Friedel-Crafts catalyst type metal halide.

17. The modified elastomer of claim 2 wherein said phenolic monomer is at least one member selected from the group consisting of m-hydroxy-styrene, m-hydroxy-α-methylstyrene, 3-hydroxy-4-methylstyrene, 3-hydroxy-4,6-dimethylstyrene, 3-hydroxy-4-isopropylstyrene, 3-hydroxy-4,6-diisopropylstyrene, 3-hydroxy-4-tert-butylstyrene, 3-hydroxy-4,6-di-tert-butylstyrene, 3-hydroxy-4-methyl-α-methylstyrene, 3-hydroxy-4,6-dimethyl-α-methylstyrene, 3-hydroxy-4-isopropyl-α-methylstyrene, 3-hydroxy-4,6-diisopropyl-α-methylstyrene, 3-hydroxy-4-tert-butyl-α-methylstyrene, 3-hydroxy-4,6-di-tert-butyl-α-methylstyrene, 3-hydroxy-4-nonylstyrene, and 3-hydroxy-4-nonyl-α-methylstyrene.

18. The modified elastomer of claim 2 wherein the copolymerization is carried out according to radical copolymerization or cationic copolymerization.

19. The modified elastomer of claim 18 wherein the radical copolymerization is carried out according to emulsion-, solution-, bulk- or suspension polymerization in the presence of a polymerization initiator at a temperature of 0° to 100° C.

20. The modified elastomer of claim 19 wherein the polymerization initiator is at least one member selected from the group consisting of hydroperoxides, peracids and their esters, peroxides and azo compounds.

21. The modified elastomer of claim 18 wherein the cationic copolymerization is carried out according to solution- or bulk-polymerization in the presence of a polymerization initiator at a temperature of −100° to 20° C.

22. The modified elastomer of claim 21 wherein the polymerization initiator is a Friedel-Crafts catalyst type metal halide.

* * * * *